May 11, 1965

D. L. BRYAN 3,182,527

SELF-LUBRICATING DIFFERENTIAL

Filed Feb. 28, 1964

INVENTOR.
Darrel L. Bryan
BY
Hovey, Schmidt, Johnson & Hovey
ATTORNEYS.

May 11, 1965 D. L. BRYAN 3,182,527
SELF-LUBRICATING DIFFERENTIAL
Filed Feb. 28, 1964 2 Sheets-Sheet 2

INVENTOR.
Darrel L. Bryan
BY
Hovey, Schmidt, Johnson & Hovey
ATTORNEYS

3,182,527
SELF-LUBRICATING DIFFERENTIAL
Darrel L. Bryan, Overland Park, Kans., assignor to Pacific Car and Foundry Company, Renton, Wash., a corporation of Washington
Filed Feb. 28, 1964, Ser. No. 348,197
6 Claims. (Cl. 74—713)

This invention relates to a differential for use in vehicles, which differential is self-lubricating, the lubrication being accomplished as a result of the operation of the differential.

It is the primary object of this invention to provide, within a substantially conventional differential and the housing therefor, means for guiding the flow of a lubricant which is distributed within the housing as a result of operation of the differential, said housing having therewithin a plurality of movable parts including a ring gear and a differential case. The differential case has lubricant therewithin and this invention also relates to means for guiding the flow of lubricant within the differential case after the lubricant has been guided by said first-mentioned means within the housing to a point where it re-enters the differential case.

It is a yet further important object of this invention to provide, in a self-lubricating differential which includes a plurality of movable parts, a pair of primary collector baffles disposed within the housing for the differential, which baffles initially collect and guide lubricant which is distributed within said housing as a result of the movement of said parts, said primary collector baffles each having disposed in spaced relationship thereto a lubricant guide plate, which plates each guide the flow of lubricant directed thereto by their corresponding primary collector baffle; the lubricant guide plates serving to direct the lubricant onto corresponding lubricant deflector plates whereby the flow of lubricant within the housing is directed to sleeves which surround the axles of the differential, the flow of lubricant then being directed to the interior of the differential case.

It is yet another important aim of this invention to provide means for guiding the flow of lubricant within the differential case after the lubricant has been directed to the interior thereof by the guiding means within the housing, the means for guiding the flow of lubricant within the differential case including a passage formed through the side gears of the differential and courses defined by the side gears of the differential case and their corresponding thrust plates, said courses each being in communication with a hole formed in the differential case whereby lubricant passing through said courses, and thereby lubricating the parts adjacent thereto, may be evacuated from the differential case through the holes which are formed therein.

Further means for guiding the flow of lubricant within the differential case include cup-like lubricant collectors which are disposed adjacent the inner ends of the axles and which are secured to the side gears, said collectors being in communication with the passages through corresponding side gears, whereby lubricant entering said passages will be received within said cup-like collectors and subsequently distributed therefrom through pathways leading to the exterior of the differential case, the pathways being defined by the spiders of the differential and the corresponding pinions thereof as by forming flats upon said spiders.

Thus there is provided a differential which is self-lubricating and which does not require the inclusion of any additional moving parts in a substantailly conventional differential, the flow of lubricant within the housing which receives the differential being guided by the means hereinabove described and the flow of lubricant within the differential case within the housing being guided by the means also hereinabove described, whereby a continuous flow of lubricant is achieved once the differential unit is placed into operation as through the driving of the vehicle of which the same forms a part.

Further objects of this invention will become apparent from the following specification and accompanying drawings, wherein.

Figure 1:
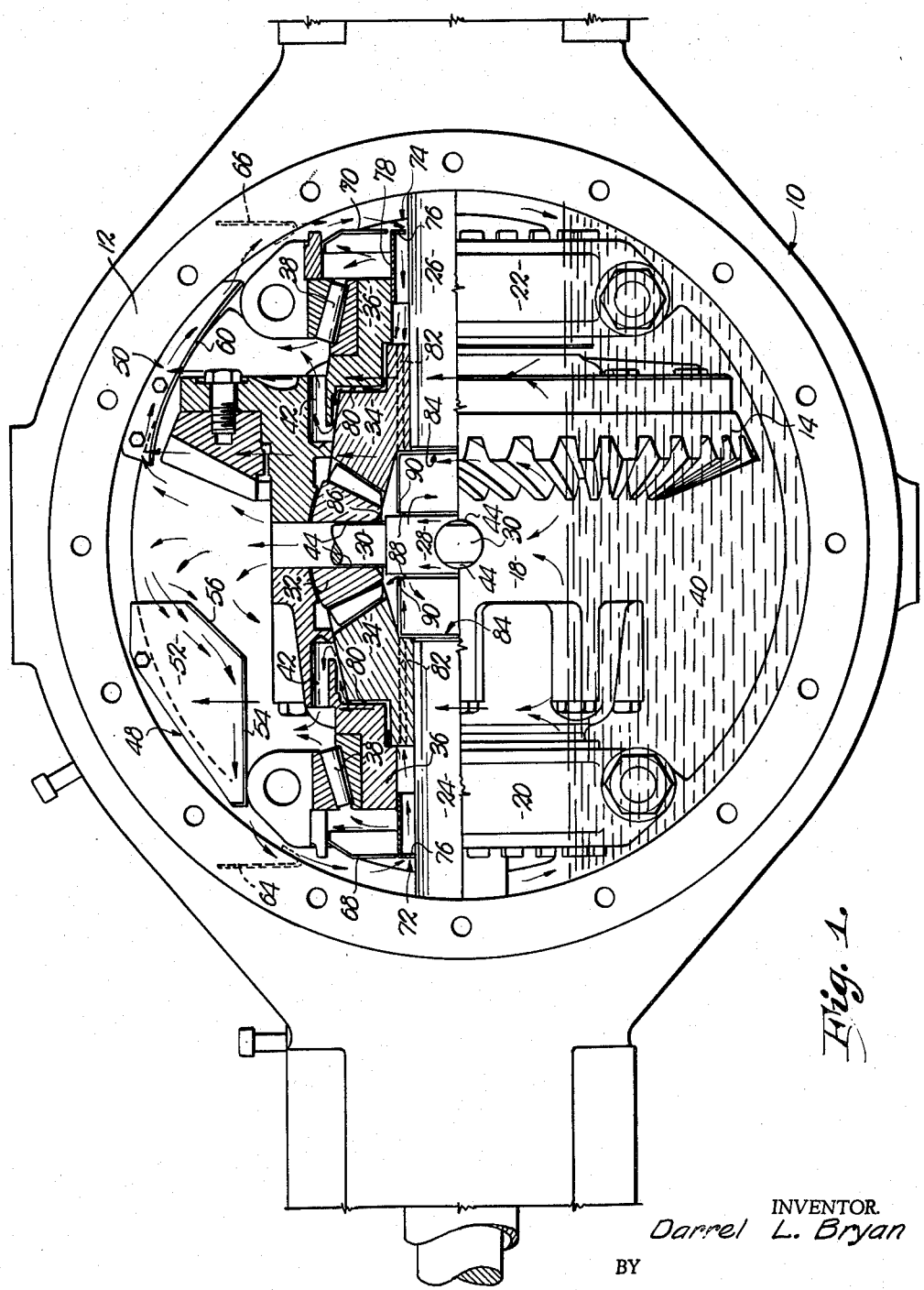
FIGURE 1 is a rear elevational view of the differential unit with the cover thereof removed and parts broken away and in section to reveal details of construction.

The differential of this invention is primarily intended for use with heavy vehicles such as trucks or the like, but may also be used with lighter vehicles such as automobiles and small trucks, it being the primary purpose of this invention to insure that the components of the differential and axle housing of the unit are continuously lubricated when the unit is in operation, whereby to give the needed and desirable protection to the bearing surfaces and the like of such unit.

To this end, there is provided an axle housing 10 which receives therewithin a differential carrier housing 12, which differential carrier housing contains therewithin, in cooperation with the axle housing 10, a substantially conventional differential construction, said construction including a plurality of movable parts such as a ring gear 14 which is driven by a pinion 16 carried by the drive shaft of the vehicle, the ring gear 14 having suitably secured thereto a differential case 18, which differential case is rotatably carried by differential carriers 20 and 22, there being a pair of axles 24 and 26 extending oppositely outwardly from the differential case and from the axle housing, said axles being coupled with wheels in the conventional manner.

The differential case 18 has therewithin the conventional components including a hub 28, which has four spiders such as 30 extending therefrom, each of said spiders carrying a pinion gear such as 32, there being side gears such as 34 disposed between corresponding pinion gears, there also being side gear thrust plates such as 36 provided for each of said side gears. Bearings such as 38 are provided for said side gear thrust plates.

Figure 3:
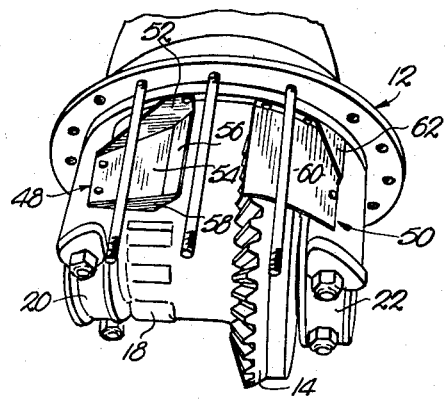
FIG. 3 is a perspective rear view thereof.

As is apparent from FIGS. 1 and 3 of the drawings, the differential case 18 is normally closed and is comprised of two halves, the differential case being rotatable together with the ring gear, when the differential unit is placed into operation through actuation of the pinion 16 by the drive shaft of the vehicle.

Figure 2:
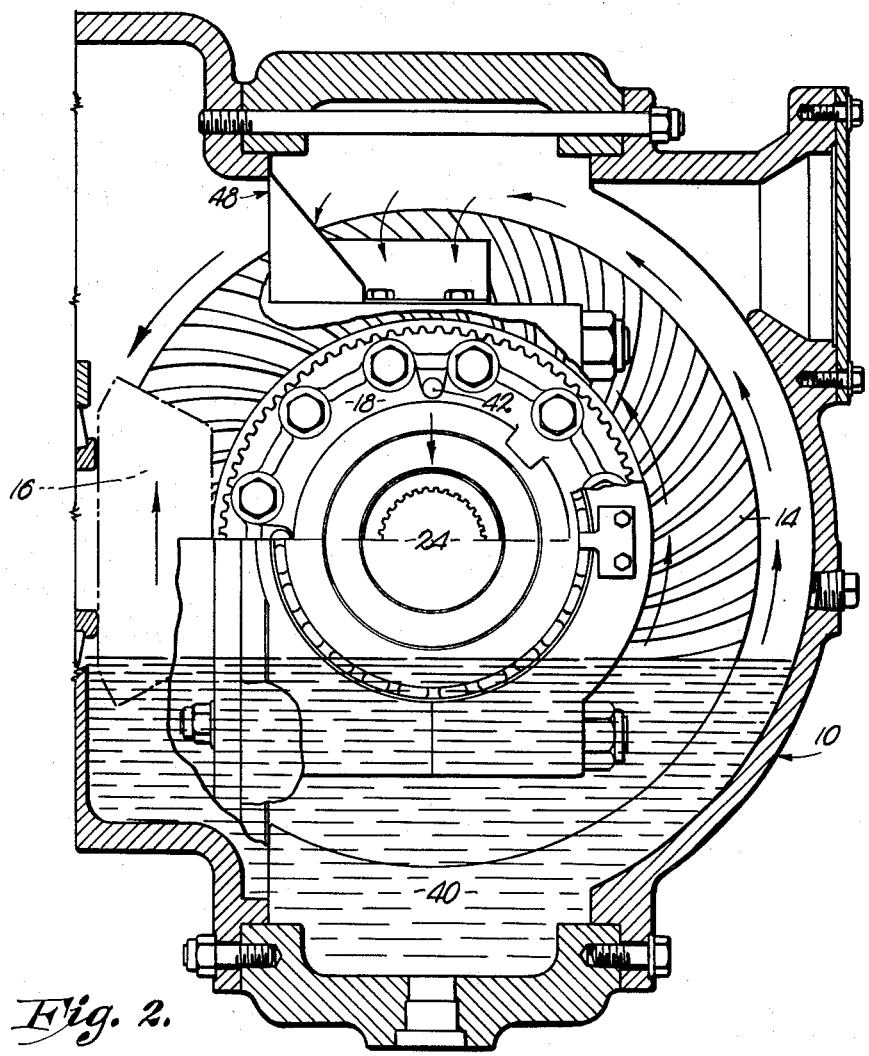
FIG. 2 is a substantially central, side-sectional view of the self-lubricating differential.

The axle housing 10 receives a supply of lubricant 40 which normally is maintained at the levels shown in FIGS. 1 and 2 when the unit is at rest, this level also being maintained within the differential case 18 as a result of the provision of holes such as 42 extending through the differential case 18 whereby the lubricant 40 may gain entrance to the differential case when the entire unit is at rest.

Lubricant is also admitted to the interior of the differential case when the same is at rest by pathways such as 44 which are defined by the spiders 30 and their respective pinions 32, these pathways being created by forming flats on each of the spiders, as is clearly shown in FIG. 1 of the drawings, whereby lubricant may gain access to the interior of the differential case through said pathways when the unit is at rest.

The differential carrier housing and axle housing are provided with cooperating means for guiding the flow of lubricant within said housings, such means including a pair of primary collector baffles 48 and 50, the configuration of said baffles being best illustrated in FIG. 3 of the drawings, it being apparent therefrom that collector baffle 48 has a back plate 52, a bottom wall 54, a side wall 56, and a front wall 58, whereby to define a trough-like member, said member being secured through its back wall 52 to the differential carrier housing 12 and also having its bottom wall 54 secured to the top of the differential carrier 20.

The other primary collector baffle 50 consists essentially of a flat bottom wall 60 having a corner plate 62 at the corner thereof furthest removed from the front edge thereof adjacent the ring gear as best shown in FIG. 3 of the drawings. The primary collector baffles are normally disposed in a position above the differential case 18 and ring gear 14 in the position shown in FIGS. 1 and 3 of the drawings.

The axle housing 10 carries a pair of lubricant guide plates 64 and 66 which correspond to baffles 48 and 50 respectively, the guide plates 64 and 66 being positioned in such a manner that lubricant flowing from the baffles 48 and 50 is guided into the plates 64 and 66 and subsequently released therefrom through an opening formed in the bottom edge of each of said guide plates 64 and 66. As is apparent from the drawings, each of the guide plates 64 and 66 comprises a substantially trough-shaped member, the opening in each of said guide plates being formed in the upturned lip of the trough whereby lubricant directed thereinto as by the corresponding baffles 48 and 50, may flow therefrom through said openings.

As the lubricant flows from guide plates 64 and 66 it is directed onto corresponding lubricant deflector plates 68 and 70, which lubricant deflector plates 68 and 70 take the form of substantially vertically disposed plates positioned beneath the openings in the guide plates 64 and 66 respectively. Thus, as the lubricant flows downwardly from said plates 64 and 66, it is deflected by plates 68 and 70 onto the corresponding axles 24 and 26 respectively.

Each of said axles has a sleeve 72 and 74, respectively, surrounding a portion thereof, said sleeves each having an inturned end 76, said inturned ends being spaced slightly from the outer surface of corresponding axles 24 and 26 whereby to permit lubricant to pass thereunder and into the interior of the sleeves 72 and 74.

Each of the sleeves 72 and 74 is provided with an aperture 78 in the side wall thereof, which apertures permit a portion of the lubricant built up within the sleeves 72 and 74 to be thrown therefrom and onto the bearings 38, all as is apparent from FIG. 1 of the drawings and as will be hereinafter more fully explained.

It will be appreciated that the sleeves 72 and 74, which are pressed and welded into the corresponding halves of the differential case 18, will serve to guide the lubricant directed thereinto along the corresponding axles 24 and 26 and toward the interior of the differential case 18. The movement of lubricant toward the interior of the differential case 18 is further aided by the presence of a vacuum which is created as a result of the rotation of the differential case 18 and the centrifugal forces built up by such rotation whereby the lubricant entering the sleeves will tend to be drawn inwardly toward the center of the differential case.

As the lubricant enters the differential case in the manner above described, it is divided into two portions, one portion thereof following courses such as 80 which are defined by grooves formed in the abutting faces of the side gears 34 and their corresponding thrust plates 36 respectively. As the lubricant passes through these courses, it lubricates the said adjacent components and then passes into the holes 42 which are formed in the differential case 18 in the manner clearly shown by the arrows on FIG. 1 of the drawings.

The other portion of lubricant 40 which enters the differential case 18 is drawn through passages 82 which are formed in the side gears 34, whereby said lubricant may enter cup-like lubricant collectors 84, which collectors 84 are suitably secured to the side gears 34. Collectors 84 are each in communication with corresponding passages 82 whereby lubricant may enter said collectors in the manner shown by the arrows in FIG. 1 of the drawings, the collectors each being spaced slightly from the hub 28 which carries the spiders 30, whereby lubricant entering said collectors 84 may be thrown therefrom as the same are rotated, the lubricant thrown therefrom passing into the pathways 44 defined by the cooperating spiders 30 and their corresponding pinions 32. Each of the pinions 32 has a bevel such as 86 formed in the base thereof, whereby lubricant leaving the collectors 84 may pass through said beveled channel and into the pathways 44 thereby passing out of the interior of the differential case 18 and into the housing 12 for subsequent recirculation.

Thus, it will be seen that as the differential unit is operated, it is continuously lubricated, this self-lubrication being achieved by the means which guide the flow of lubricant distributed within the housing and within the differential case as a result of operation of the unit. The path of flow of the lubricant within the housing and within the differential case is illustrated by the arrows applied to FIGS. 1 and 2 of the drawings and the flow of such lubricant, when the differential unit is operated, is described in more detail hereinafter.

When the unit is at rest and no movement is being imparted thereto, the lubricant contained within the axle housing 10 tends to seek the same level with the lubricant which is admitted to the interior of differential case 18 as through the holes 42 and the pathways 44 as hereinabove explained.

When the differential unit is placed into operation as by driving the ring gear 14 by a pinion 16 coupled to the drive shaft of the vehicle, the major components of the differential rotate, creating a centrifugal force which evacuates the lubricant contained within the differential case 18 and which rotative movement also distributes the lubricant 40 in the supply contained within the axle housing whereby lubricant is distributed throughout the housing.

It will be appreciated that as the differential case 18 and ring gear 14 rotate, they serve to throw a rather substantial amount of lubricant toward the upper part of the differential carrier housing and axle housing viewing FIG. 1 of the drawings, and it is this lubricant which is guided in its flow within the carrier and axle housings by the structural means hereinabove defined. Thus lubricant is thrown tangentially off of the circumferential surfaces of the differential case 18 and the ring gear 14, and a substantial volume of this lubricant strikes the primary collector baffles 48 and 50 and is collected thereby.

The lubricant collected within baffles 48 and 50 flows, by gravity, toward the lowermost end of said baffles and thence over the upper portion of the differential carriers 20 and 22, respectively, and into the lubricant guide plates 64 and 66. These guide plates each have an opening in the upturned edge thereof whereby lubricant entering the guide plates 64 and 66 may pass therefrom through said openings, the lubricant moving downwardly through gravity and striking the corresponding lubricant deflector plates 68 and 70.

It will be appreciated that a substantial amount of lubricant may be allowed to build up in the baffles 48 and 50 and within the guide plates 64 and 66, this lubricant ultimately moving to the corresponding axles 24 and 26 through the action of gravity and entering the sleeves 72 and 74. A partial vacuum exists along the axles 24 and 26, this vacuum being created by the rotation of the differential case 18 and the evacuation of lubricant therefrom by a centrifugal force which leaves a void and tends to create a slight inwardly directed suction force. This force tends to draw the lubricant reaching the sleeves 72 and 74 inwardly along the corresponding axles 24 and 26 and to the interior of the differential case 18. However, as hereinabove pointed out, each of the sleeves 72 and 74 is provided with an aperture 78 whereby some of the lubricant accumulated therewithin may be thrown radially outwardly and toward the bearings 38 of the side gear thrust plates 36, this lubricant passing through said bearings, as shown by the arrows, and thence again into the housing for recirculation.

The remainder of the lubricant which enters the sleeves 72 and 74 is drawn inwardly along axles 24 and 26 by the vacuum mentioned above, this lubricant dividing into two portions, the first portion passing along a course 80 which is defined between the side gears 34 and their corresponding thrust plates 36, this course being formed by grooves which are milled into the side gears and their thrust plates. As is apparent from FIG. 1 of the drawings, these courses are in communication with the holes 42 provided in the differential case 18 whereby, after the lubricant has passed through said courses 80, it may be evacuated from the differential case 18 through the holes 42 and thence again placed into the housing for subsequent recirculation.

The remaining portion of the lubricant which is drawn inwardly along axles 24 and 26 moves through passages 82 which are formed within the side gears 34 toward the center of the unit and subsequently into the cup-like lubricant collectors 84. Lubricant reaching the collectors 84 is evacuated therefrom through a space 88 between said collector and the hub 28 and its spiders 30, said lubricant which leaves the collectors 84, passing over the rim 90 thereof and into pathways defined by the spiders 30 and their corresponding pinions 32. The lubricant then passes along these pathways and is thrown out of the differential case and into the reservoir within the axle housing for further recirculation. The movement of lubricant through the pathways 44 provides lubrication under a slight pressure for the spider pinions.

Thus, it will be seen that, through the utilization of the means above described, both within the carrier housing and within the differential case, and the utilization of the centrifugal forces normally created by the rotation of the movable parts within the unit, the lubricant is moved from the reservoir 40 and from within the differential case 18 throughout the entire differential unit in such a manner as to achieve a maximum lubricating effect of the components of the unit. This is accomplished without the addition of any major moving parts to the differential unit, but by the modification of certain of the components thereof, and the addition of baffles, deflectors, sleeves and the like, all as hereinabove described. Thus, there is provided a self-lubricating differential which, when in operation, maintains a constant recirculation of lubricant therewithin, all to the end that the components may be given the lubricating protection which is necessary and desirable.

Having thus described the invention, what is claimed as new and desired to be secured by Letters Patent is:

1. A self-lubricating differential comprising a housing having a plurality of movable parts enclosed therewithin; means for imparting movement to said parts, said parts including a ring gear and a differential case; a pair of rotatable axles extending oppositely outwardly from said differential case; a supply of lubricant within said housing, said parts being partially immersed in said lubricant when the parts are at rest, said parts distributing the lubricant within said housing when the parts are placed in motion; means for guiding the flow of the lubricant within said housing as the same is distributed by movement of said parts; and means for guiding the lubricant from the housing to the interior of said differential case, said means including a sleeve surrounding a portion of each of said axles and slightly spaced therefrom whereby to present an annular space around each of said axles whereby lubricant may be drawn therethrough and along said axles upon the rotation of the latter.

2. A self-lubricating differential as set forth in claim 1, each of said sleeves having an aperture formed in the side wall thereof whereby to permit lubricant to pass therethrough.

3. A self-lubricating differential comprising a housing having a plurality of movable parts enclosed therewithin, said movable parts including a ring gear and a differential case, said differential case having therewithin a plurality of spiders, pinion gears and side gears, the interior of said differential case being in communication with said housing; a supply of lubricant within said housing and said differential case; means for imparting rotative movement to said ring gear and said differential case whereby to cause evacuation of lubricant from the interior of said differential case and the distribution thereof and the lubricant from the supply within the housing throughout said housing; means for guiding the flow of distributed lubricant within the housing; and means for guiding the flow of lubricant interiorly of said differential case, said means including cup-like lubricant collectors carried by said side gears, there being a passage formed through said side gears placing said lubricant collectors in communication with said housing.

4. A self-lubricating differential as set forth in claim 3, said spiders defining a pathway from said lubricant collectors to the exterior of said differential case whereby lubricant may pass from said collectors out of said differential case.

5. A self-lubricating differential as set forth in claim 4, said pinion gears each being carried by a spider, said pathways extending between said pinions and their corresponding spiders.

6. A self-lubricating differential comprising a housing having a plurality of movable parts therewithin, said parts including a ring gear, a differential case and a pair of axles extending oppositely outwardly from said differential case, said differential case having therewithin a plurality of spiders, a pinion gear carried by each spider, a plurality of side gears and a thrust plate for each side gear, said differential case having a plurality of holes formed therein placing the interior of said case in communication with said housing; a supply of lubricant within said housing and said differential case; means for imparting rotative movement to said ring gear and said differential case whereby to cause evacuation of lubricant from the interior of said case and the distribution thereof and the lubricant from the supply within the housing throughout said housing; means for guiding the flow of distributed lubricant within the housing, said means including a pair of primary collector baffles normally positioned above said ring gear and said differential case, a lubricant guide plate corresponding to each of said primary collector baffles for receiving the lubricant directed thereto by its corresponding baffle, there being an opening in each of said guide plates for releasing the lubricant directed thereto, a deflector plate beneath each of said openings and a sleeve surrounding a portion of each of said axles, said sleeves each having the outer end thereof in substantial alignment with a corresponding deflector plate, said sleeves directing the lubricant toward the interior of said differential case; and means for guiding the flow of lubricant interiorly of said differential case, said means including a course defined by each side gear and its corresponding thrust plate, each course being in communication with a corresponding hole in the differential case, whereby lubricant passing along each course may be evacuated from the interior of the case through its corresponding hole, a cup-like lubricant collector carried by each of the side gears, there being a passage through each side gear placing said cups in communication with corresponding sleeves, said spiders cooperating with their respective pinions to define pathways, said pathways each being in communication with the housing and with corresponding cups, whereby lubricant entering said cups from said sleeves through said passages may be evacuated from the interior of said differential case through said pathways and into said housing.

References Cited by the Examiner
UNITED STATES PATENTS 2,015,108   9/35   Harper _____ 184—11

DON A. WAITE, *Primary Examiner.*